United States Patent
Chang et al.

(10) Patent No.: US 8,898,573 B2
(45) Date of Patent: Nov. 25, 2014

(54) METHOD AND APPARATUS FOR PROVIDING TOOLBAR SERVICE

(75) Inventors: Joon-Kee Chang, Yongin (KR); Hyung Rae Kim, Anyang (KR); Chan Ho Yun, Seoul (KR); Soon Ho Kwon, Seoul (KR); Kyungran Lee, Seoul (KR)

(73) Assignee: NHN Corporation, Seongnam (KR)

( * ) Notice: Subject to any disclaimer, the term of this patent is extended or adjusted under 35 U.S.C. 154(b) by 1043 days.

(21) Appl. No.: 12/441,265

(22) PCT Filed: Sep. 6, 2007

(86) PCT No.: PCT/KR2007/004314
§ 371 (c)(1),
(2), (4) Date: Mar. 13, 2009

(87) PCT Pub. No.: WO2008/032954
PCT Pub. Date: Mar. 20, 2008

(65) Prior Publication Data
US 2010/0023873 A1 Jan. 28, 2010

(30) Foreign Application Priority Data
Sep. 14, 2006 (KR) .................. 10-2006-0088950

(51) Int. Cl.
*G06F 3/048* (2013.01)
*G06F 17/22* (2006.01)
*G06F 17/30* (2006.01)

(52) U.S. Cl.
CPC .................. *G06F 17/30899* (2013.01)
USPC ................... 715/747; 715/762; 715/744

(58) Field of Classification Search
CPC .. G06F 3/048; G06F 3/0484; G06F 3/172247
USPC ........................... 715/747, 762, 744
See application file for complete search history.

(56) References Cited

U.S. PATENT DOCUMENTS

| | | | |
|---|---|---|---|
| 7,412,655 B2 * | 8/2008 | Wada et al. ............. | 715/744 |
| 2002/0149623 A1 * | 10/2002 | West et al. ............. | 345/765 |
| 2004/0165007 A1 * | 8/2004 | Shafron ............. | 345/781 |
| 2005/0028165 A1 * | 2/2005 | McGowan et al. ........ | 719/310 |
| 2005/0262481 A1 * | 11/2005 | Coulson ............. | 717/120 |
| 2006/0015839 A1 * | 1/2006 | Owens et al. ............. | 717/100 |
| 2006/0095860 A1 * | 5/2006 | Wada et al. ............. | 715/771 |
| 2007/0271523 A1 * | 11/2007 | Lacey et al. ............. | 715/762 |

FOREIGN PATENT DOCUMENTS

| | | |
|---|---|---|
| KR | 10-2001-0050351 | 6/2001 |
| KR | 10-2003-0037077 | 5/2003 |
| KR | 10-2003-0088839 | 11/2003 |
| KR | 10-2006-0061743 | 6/2006 |

* cited by examiner

*Primary Examiner* — Daeho Song
(74) *Attorney, Agent, or Firm* — Harness, Dickey & Pierce, P.L.C.

(57) ABSTRACT

Disclosed herein are a method and apparatus for providing a toolbar service. The method for providing a toolbar service in a system connected to a user client via a network includes generating a file which can be edited by a user and includes at least one item information for defining an attribute of an interface displayed in a toolbar; receiving a request for download of a toolbar application from the user client; and transmitting the toolbar application including the file to the user client. The toolbar application installed in the user client updates the file according to a user's request for editing an item, parses the updated file to dynamically generate the interface of the toolbar. It is possible to provide a variety of interfaces according to a theme.

20 Claims, 14 Drawing Sheets

FIG. 10

```xml
<?xml version="1.0" encoding="euc-kr" ?>
- <naver_toolbar_thema>
 - <head>
     <name>NAVER BASIC THEME</name>
     <version>1.0.0.1</version>
     <create_time>2005-12-03 12:00:00</create_time>
     <create_user>nhn</create_user>
     <last_modify_time>2006-02-14 14:00:00</last_modify_time>
   </head>
 - <body>
   - <sectionA>
     - <item tpye="DROPDOWNBUTTON" title=" NAVER" id="NAVER_DEFAULT_BUTTON">
       - <action type=" URL">
           <command> http://www.naver.com</command>
         </action>
       - <set>
         - <item type="BASICMENU  title="NAVER HOME PAGE">
           - <action type="URL">
               <command> http://www.naver.com</command>
             </action>
           </item>
         - <item type=" BASICMENU  title="HANGAME HOME PAGE">
           - <action type="URL">
               <command> http://www.hangame.com</command>
             </action>
           </item>
         - <item type=" BASICMENU  title="JUNIVER HOME PAGE">
           - <action type=" URL">
               <command> http://jr.naver.com</command>
             </action>
           </item>
           <item type" SEPERATOR"/>
         - <item type=" BASICMENU title="KNOWLEDGE iN">
           - <actionl type=" URL">
               <command> http://www.kin.naver.com</command>
             </action>
           </item>
           <item type" SEPERATOR"/>
         - <item type=" BASICMENU"title=' KEYWORD/ADDRESS DELETION >
           - <actiont type=" BUILTIN">
               <command> DeleteHistory</command>
             </action>
           </item>
```

FIG. 11

```xml
<?xml version="1.0" encoding="euc-kr" ?>
<naver_toolbar_config>
  <head>
    <name> NAVER BASIC VERSION THEME SETTING </name>
    <version>1.0.0.1</version>
    <create_time>2005-12-03 12:00:00</create_time>
    <create_user> nhn</create_user>
    <last_modify_time> 2006-04-05 12:04:55</last_modify_time>
  </head>
  <body>
    <sectionA>
      <item id=" NAVER_DEFAULT_BUTTON "/>
    </sectionA>
    <sectionB>
      <item id=" SEARCH_MYPC " />
      <item id=" VIRUS" />
      <item id=" DIG" />
      <item id=" BLOG" />
      <item id=" POPUP" />
      <item id=" SHOTCUT" />
      <item id=" ZOOM" />
    </sectionB>
  </body>
</naver_toolbar_config>
```

FIG. 12
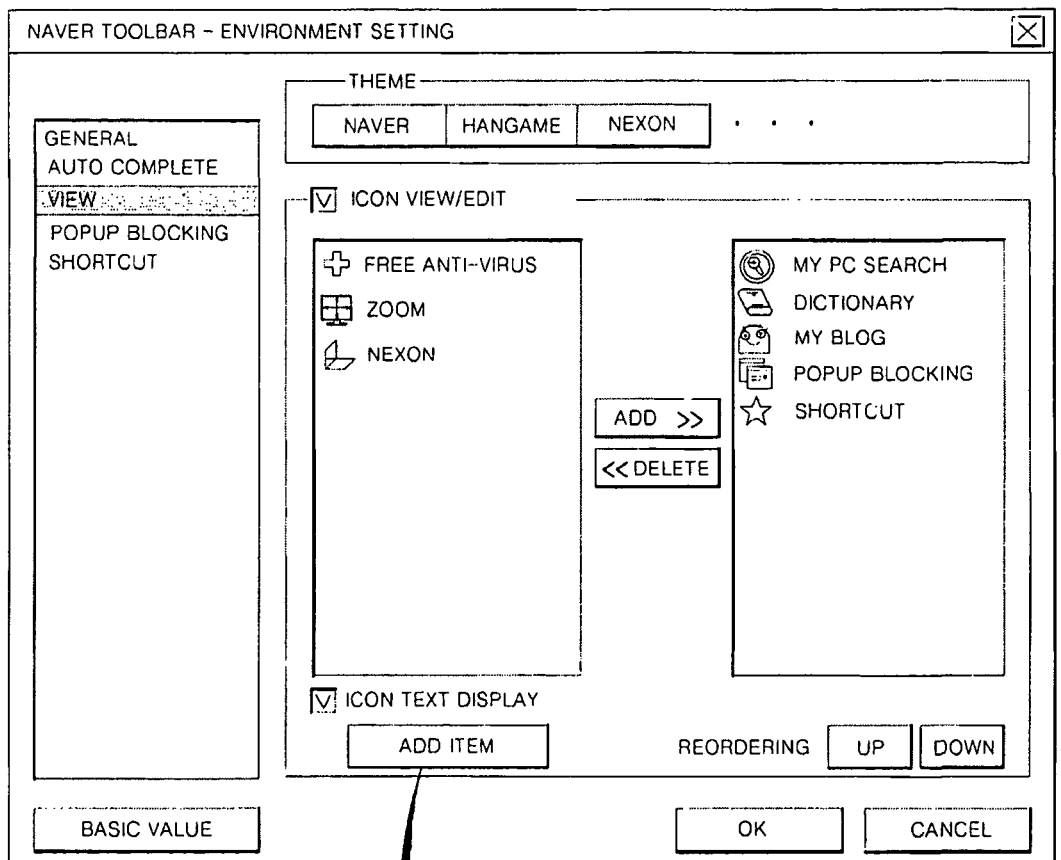
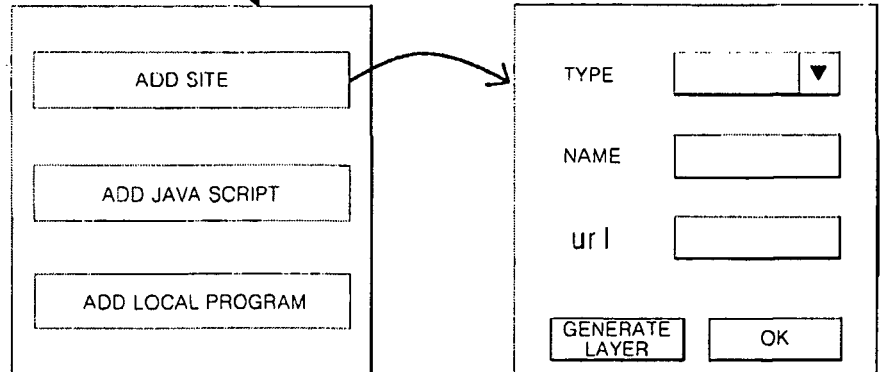

METHOD AND APPARATUS FOR PROVIDING TOOLBAR SERVICE

CROSS-REFERENCES TO RELATED APPLICATIONS

This application is a U.S. national phase application, pursuant to 35 U.S.C. §371, of PCT/KR2007/004314, filed Sep. 6, 2007, designating the United States and published on Mar. 20, 2008 as WO 2008/032954 A1, which claims priority to Korean Application No. 10-2006-0088950, filed Sep. 14, 2006. The entire contents of the aforementioned patent applications are incorporated herein by this reference.

TECHNICAL FIELD

The present invention relates to a method and apparatus for providing a toolbar service, and more particularly to a method and apparatus which allows a user to dynamically generate a toolbar for facilitating access to information by the user in association with a browser.

BACKGROUND ART

With the development of the Internet, users can access necessary information at anywhere and anytime.

Conventionally, access to information via the Internet was mainly realized by a web browser. The web browser is a software for displaying a variety of information retrieved from a web server when a user's computer is connected to the Internet. Currently, the web browser is developed so as to be easily used by only clicking a mouse several times in combination with a variety of Internet functions such as file transfer protocol (FTP), Telnet, News or Gopher as well as the World-Wide Web (WWW).

There are various types of web browsers. Among them, Internet Explorer of Microsoft Corporation and Communicator of Netscape Corporation are being most widely used.

The web browser includes an address bar for inputting the address of information to be accessed. A user can confirm necessary information by inputting a uniform resource locator (URL), such as a domain name or an IP address, in the address bar.

Recently, many users use a searching service and want to easily access a site which is frequently used. However, if only the web browser is used, it is inconvenient to access information.

For example, when a user wants to search for a specific keyword, the user inputs the address of a site for providing a searching service in the address bar of the web browser, confirms a main web page of the site, and inputs a desired keyword in a searching bar included in the main web page. That is, it is inconvenient that many processes have to be performed to conduct the keyword search.

In order to remove such inconvenience, a content provider provides a toolbar service for facilitating access to information by a user.

A toolbar is activated in a predetermined region at the time of executing the web browser and includes a keyword inputting bar and a variety of additional function buttons. When the user inputs a keyword in the inputting bar of the toolbar, a site for providing the toolbar directly provides the searched result to the user.

The toolbar performs additional functions such as desktop searching and popup blocking in addition to a web searching function and performs a function for generating interfaces related to these functions in a toolbar region.

Due to the convenience of the toolbar and the variety of additional functions, the use of the toolbar has been increased. However, a conventional toolbar cannot provide a customized service to the user.

In addition, in spite of that the type (for example, Naver, Hangame, Nexon or the like) of a site, which is frequently used, varies according to the user and the type of a low-level service used in the site varies according to the site, the conventional toolbar service provides a uniform menu for a searching service. Accordingly, it is difficult to satisfy a variety of desires of users.

SUMMARY Of INVENTION

Therefore, the present invention has been made in view of the above problems, and it is an object of the present invention to provide a method and apparatus for providing a toolbar service, which are capable of providing a specified toolbar to a user.

It is another object of the present invention to provide a method and apparatus for providing a toolbar service, which are capable of dynamically generating a toolbar according to the preference of a user.

It is a further object of the present invention to provide a method and apparatus for providing a toolbar editing service, which are capable of allowing a user to easily edit a toolbar.

In accordance with the present invention, the above and other objects can be accomplished by the provision of a method for providing a toolbar service in a system connected to a user client via a network, the method including: generating a file which can be edited by a user and includes at least one item information for defining an attribute of an interface displayed in a toolbar; receiving a request for download of a toolbar application from the user client; and transmitting the toolbar application including the file to the user client, wherein the toolbar application installed in the user client updates the file according to a user's request for editing an item and parses the updated file to dynamically generate the interface of the toolbar.

In accordance with another aspect of the present invention, there is provided a computer-readable recording medium having embodied thereon a program for performing the method.

In accordance with yet another aspect of the present invention, there is provided a recording medium in which a program of commands executed by a user client is implemented in order to provide a toolbar service and which can be read by the user client, the recording medium including a program performing: maintaining a file which can be edited by a user and includes at least one item information for defining an attribute of an interface displayed in a toolbar; parsing the file to output the item information included in the file when a user's request for editing an item is received; updating the file according to information inputted by the user; and parsing the updated file to dynamically generate the interface of the toolbar.

In accordance with yet another aspect of the present invention, there is provided an apparatus for providing a toolbar service in a system connected to a user client via a network, the apparatus including: a file generator for generating a file which can be edited by a user and includes at least item information for defining an attribute of an interface displayed in a toolbar; a file extractor for extracting the file when a request for download of a toolbar application is received from the user client; and a user client communication unit for transmitting the toolbar application including the file to the user client, wherein the toolbar application installed in the user client updates the file according to a user's request for editing the item, parses the updated file to dynamically generate the interface of the toolbar.

BRIEF DESCRIPTION OF THE DRAWINGS

The above and other objects, features and other advantages of the present invention will be more clearly understood from the following detailed description taken in conjunction with the accompanying drawings, in which:

FIG. 10 is a view showing an example of the theme file according to the present invention;

FIG. 11 is a view showing an example of the setting file according to the present invention;

FIG. 12 is a view showing an example of an edit interface according to the present invention;

DETAILED DESCRIPTION OF THE INVENTION

Figure 1:
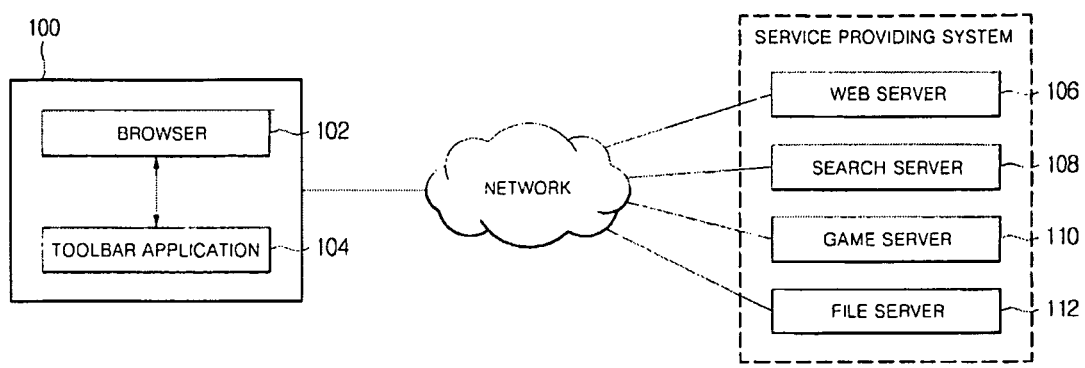
FIG. 1 is a block diagram showing the configuration of a system for providing a toolbar service according to an embodiment of the present invention.

The above and other objects, features and other advantages of the present invention will be more clearly understood from the following detailed description taken in conjunction with the accompanying drawings. It should be noted that like reference numerals refer to like parts throughout the several views. Hereinafter, a method and apparatus for providing a toolbar editing service according to an embodiment of the present invention will be described in detail.

FIG. 1 is a block diagram showing the configuration of a system for providing a toolbar service according to an embodiment of the present invention.

Referring to FIG. 1, a user client 100, which is connected to the toolbar service providing system according to the present invention via a network, downloads and installs a toolbar application from the toolbar service providing system, and includes a plurality of terminal devices for processing a user's request using the installed toolbar application, such as a desktop personal computer (PC), a laptop PC, a mobile phone, a personal digital assistant (PDA) and a mobile broadcast system (MBS) phone.

At this time, the network may include a wired network including the Internet and a private line and a wireless network including the wireless Internet, a mobile communication network and a satellite communication network.

In the user client 100 according to the present invention, a browser 102 and a toolbar application 104 are installed. The browser 102 may be a general web browser and a wap browser installed in a mobile communication terminal, and performs a function for transmitting access information such as address information or query information inputted by a user via a network.

Here, the address information may be a URL such as a domain name or an IP address of a site to be accessed by the user and the query information may be search request information about a keyword inputted by the user.

When the browser 102 transmits the access information, the user may access a desired site and confirm a searched result.

The toolbar application 104 is a program for activating a toolbar in a predetermined region of the browser 102 and facilitating the access to information by the user in association with the browser 102.

The toolbar application 104 may be received via the network and installed in the user client 100 as described below. However, it is apparent to those skilled in the art that the method of installing the toolbar application 104 is not limited to this and the toolbar application 104 may be installed in the user client 100 via a separate recording medium.

The toolbar service providing system for providing the toolbar application 104 to the user client 100 may include a web server 106, a search server 108, a game server 110 and a file server 112.

The web server 106 performs a function for receiving a user's request and generating a web page according to the user's request. The web page provided by the web server 106 may include guide information for installing the toolbar application 104.

The file server 112 is connected to the user client 100 when the user makes a request for the download of the toolbar application 104. The file server 112 stores and manages information about the toolbar application 104 which can be provided to the user client 100.

In particular, the file server 112 according to the present invention generates and stores an execution file for executing the toolbar application 104, a theme file including information about all components (items) which can be displayed in the toolbar, and a setting file including item information which is set to be displayed in the toolbar at the time of installing the toolbar application 104.

Here, the item information defines an attribute of interface which can be displayed in the toolbar.

The theme file and the setting file according to the present invention are a set of external environment files. The theme file and the setting file may, for example, include, but are not limited to, information about a site for providing independent services such as a Naver theme, a Hangame theme and a Nexon theme. Alternatively, the theme file and the setting file may include information about a site which is added according to the user's request for editing, information for executing a java script and information for executing a local program.

That is, the theme file and the setting file according to the present invention can be edited by the user. The editing may include addition of a new item, removal of the existing item and reordering of the items which are displayed in the current toolbar. Hereinafter, a method for editing the theme file and the setting file will be described in detail.

When the download of the toolbar application 104 is requested by the user client 100, the file server 112 extracts the theme file and the setting file and transmits the theme file and the setting file to the user client 100 together with the execution file for executing the toolbar application 104.

In one embodiment, the file server 112 according to the present invention stores the theme file and setting file which vary according to the theme. When a request for the download of a predetermined theme is requested by the user client 100, the file server 112 extracts and transmits a theme file and a setting corresponding to the predetermined theme to the user client 100. That is, according to the present invention, the file server 112 stores the theme file and the setting file which vary according to the theme, and, when the user selects one theme, provides a theme file and a setting file corresponding to the selected theme such that the user can use the toolbar having an interface which varies according to the theme.

Figure 16:
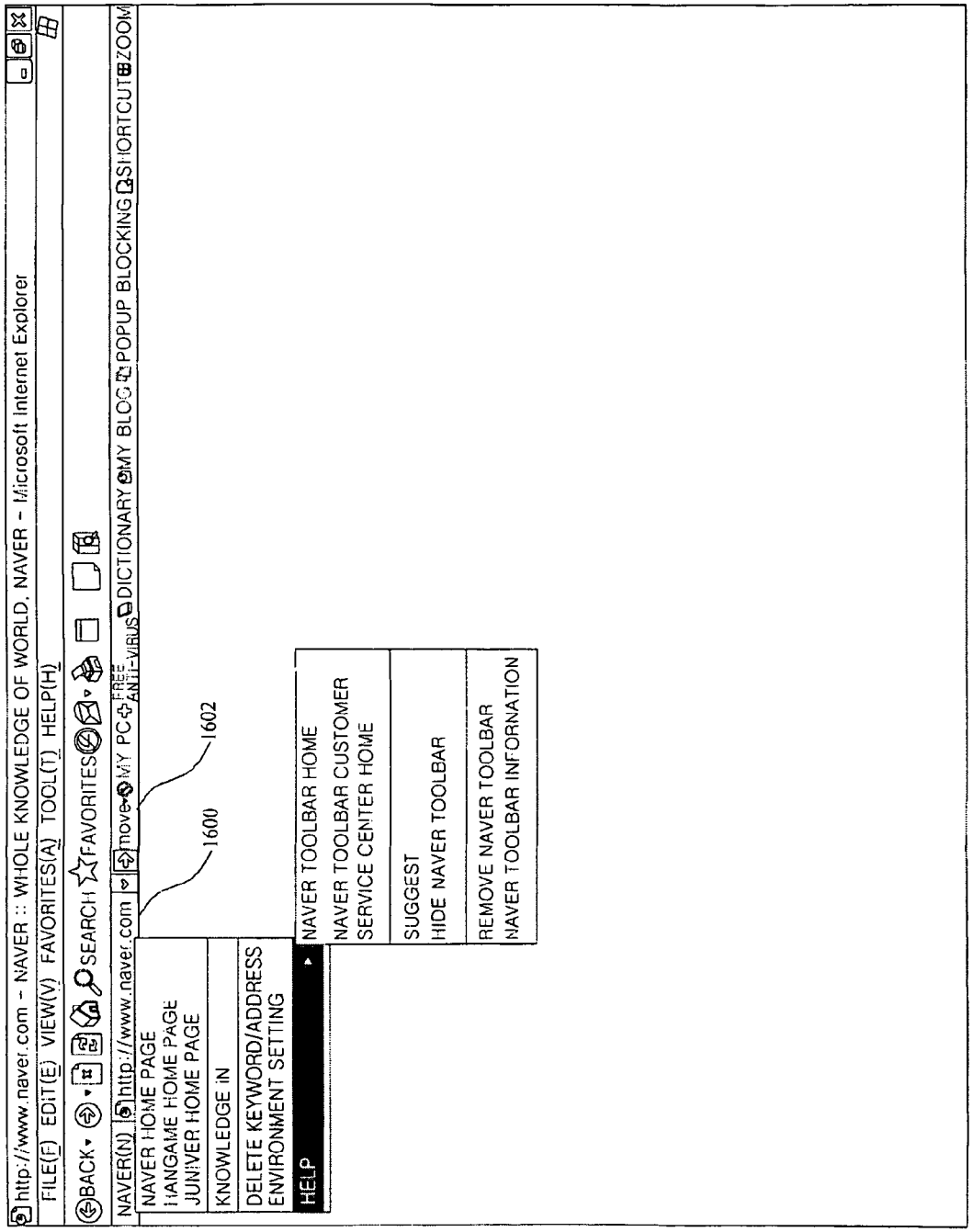
FIGS. 16 to 19 are views showing examples of a screen of a toolbar interface according to the present invention.

For example, if the Naver theme is selected, as shown in FIG. 16, the file server 112 may provide the theme file including the item information for defining the attribute of the interface, such as "My PC Search", "Free Anti-virus", "Dictionary", "My Blog", "Popup Blocking", "Shortcut", and "ZOOM" to user client 100.

At this time, a portion of the item information may be included in the setting file at the time of transmitting the toolbar application 104. If only the items "My PC Search", "Dictionary", "My Blog" and "Popup Blocking" are included in the setting file, only the interface corresponding to the items included in the setting file may be displayed on a screen at the time of installing the toolbar application 104.

Meanwhile, in the Hangame theme, the theme file and the setting file may include item information of the Hangame theme in addition to the item information of the Naver theme. Here, the item information of the Hangame theme includes at least one of a representative name, a representative URL, a representative service name, a representative service URL and layer information of a site. The layer information may include information for directly accessing a low-level service, such as the names and the URL information of low-level services ("Kwonho", "Doublematgo" or the like) which are provided by the Hangame.

Figure 17:
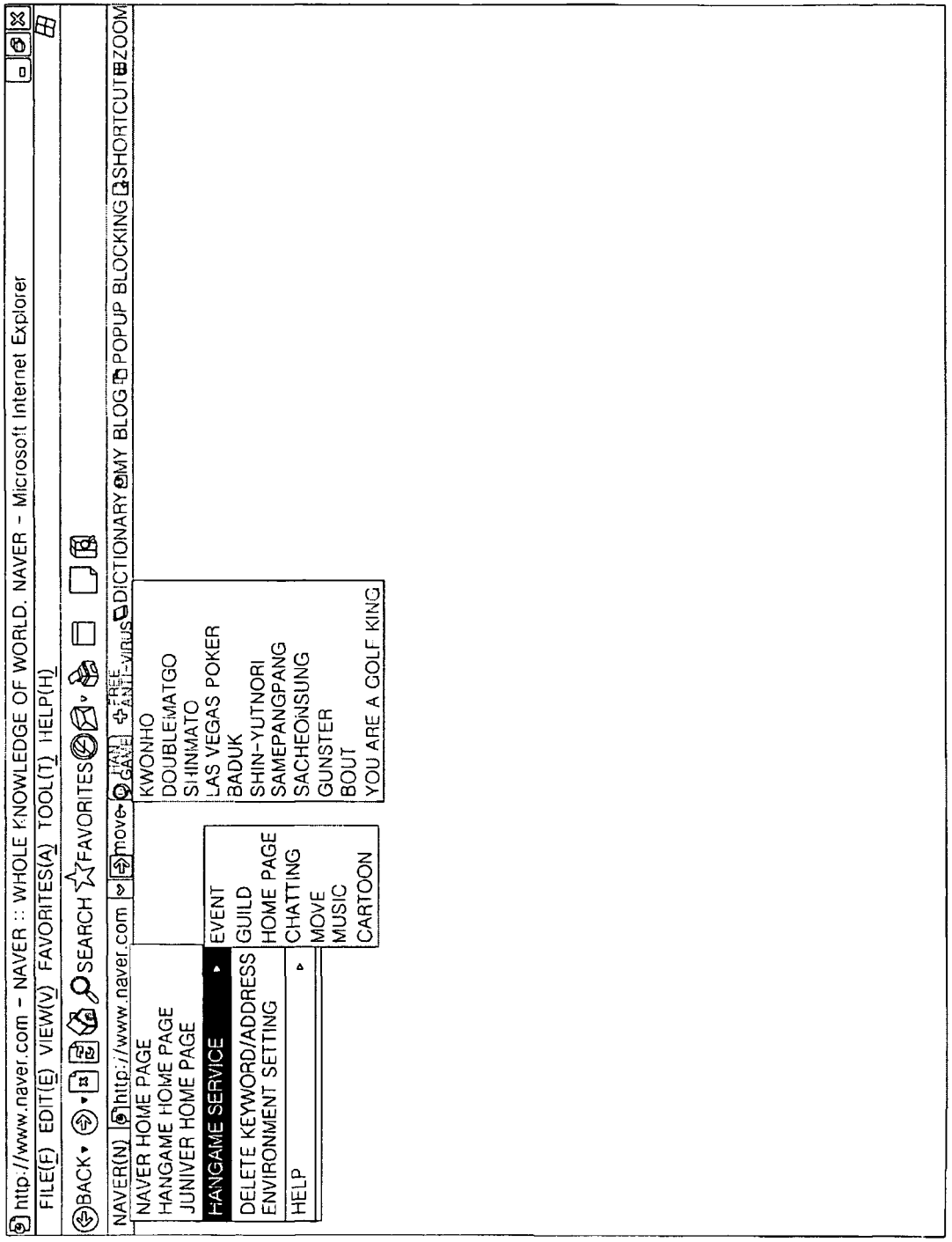

When the user selects the Hangame theme and installs the toolbar application 104, as shown in FIG. 17, a Hangame interface included in the setting file is generated in a predetermined region of the toolbar and the interface corresponding to the items for accessing the low-level layer of the Hangame (a plurality of games provided by the Hangame) may be generated in a pull-down manner.

In the Nexon theme, item information including an access address, a name, and a low-level layer of a Nexon site may be included in the theme file and the setting file, similar to the Hangame theme. When the user selects the Nexon theme and installs the toolbar application 104, as shown in FIGS. 18 and 19, an interface corresponding to the Nexon theme may be generated in a predetermined region of the toolbar.

Figure 18:
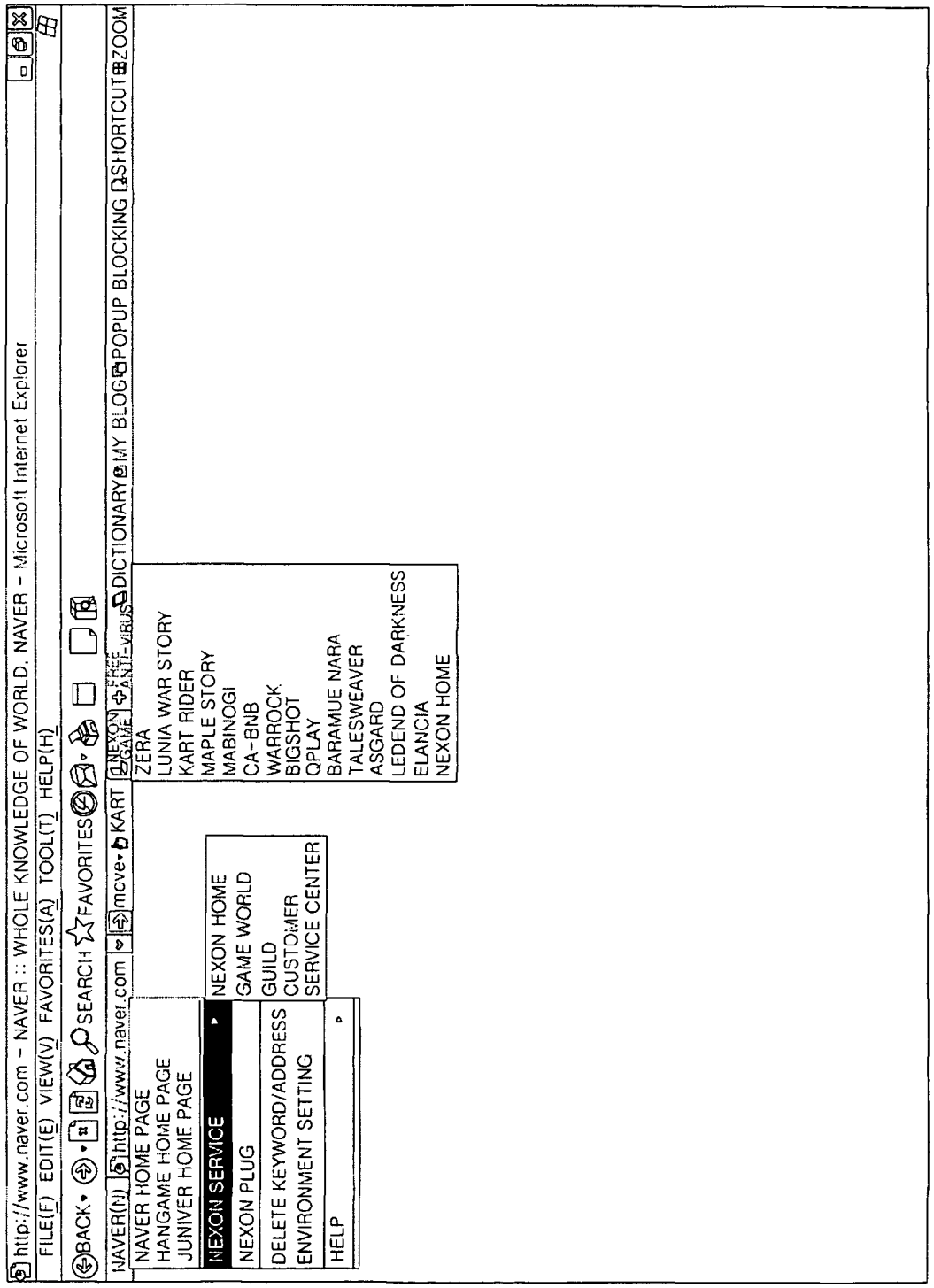
Figure 19:
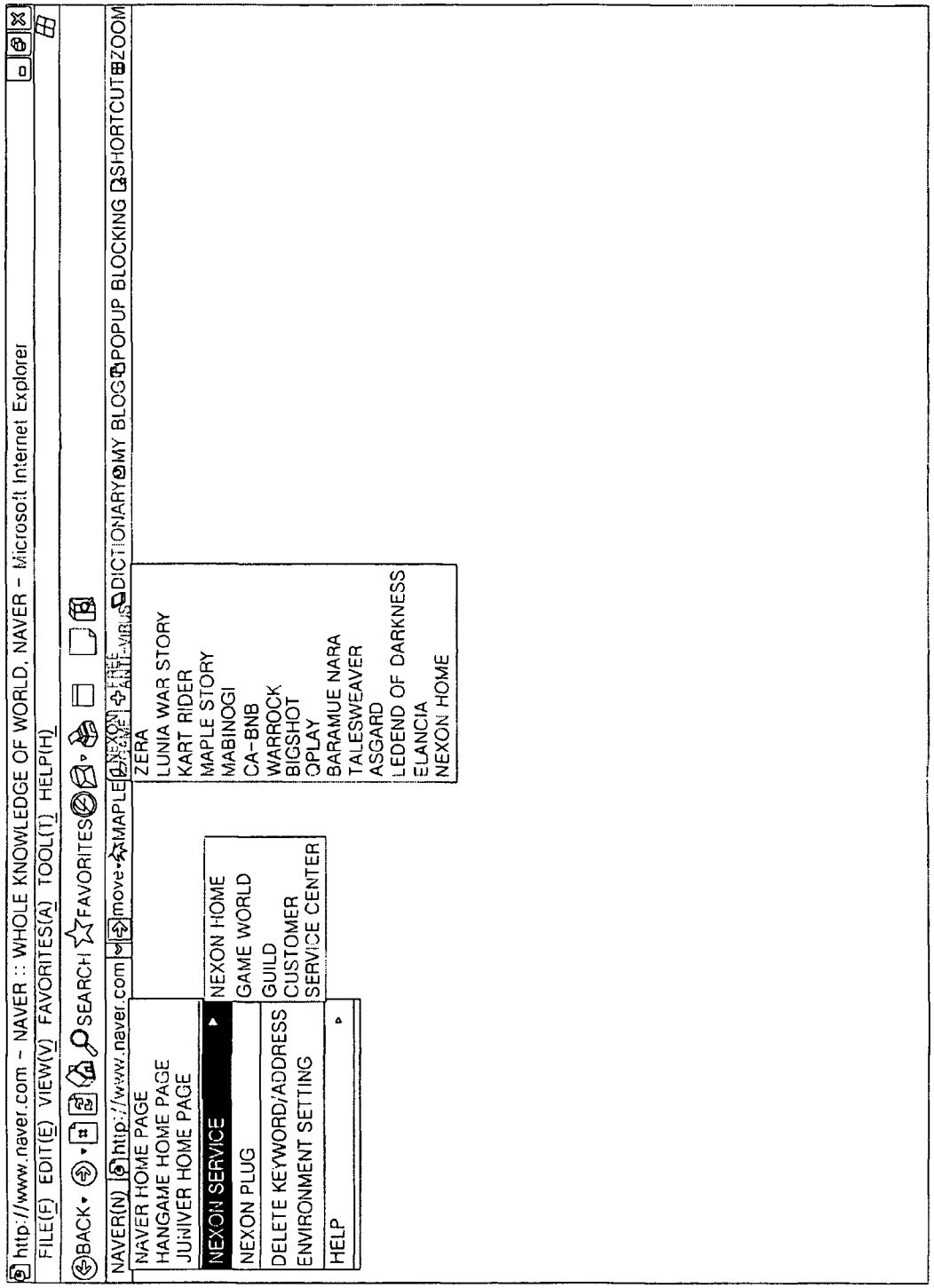

At this time, as shown in FIGS. 18 and 19, even in the same theme (Nexon theme), an interface may vary according to a representative service ("Kart rider" or "Maple").

Although the file server 112 previously generates and provides the theme file to the user client 100, according to another embodiment of the present invention, the toolbar application 104 for storing information about the theme file and the setting file may be separately provided via a recording medium, and the toolbar application 104 may parse the theme file and the setting file and generate the toolbar including the interface according to the theme in a predetermined region of the browser.

The toolbar application 104 according to the present invention may provide and install a toolbar according to a predetermined theme in conformity with the preference of the user, instead of providing a constant toolbar. Accordingly, the user can more conveniently access desired information.

The search server 108 receives the query information of a predetermined keyword from the user client 100 and searches for the keyword. The search server 108 collects a web page, a blog, a cafe, a special material including the keyword via a search engine and provides the search result to the user.

When the toolbar application 104 is installed, an inputting bar is generated in the toolbar. When the user inputs a keyword in the inputting bar, the query information of the keyword may be transmitted to a predetermined search server 108 (included in the toolbar service providing system) and the search server 108 provides the search result.

The game server 110 provides a game service to the user and performs transmission of a channel list of a game selected by the user, entrance into a channel and a game room, and a process of controlling the play of the game.

Although the search server 108 and the game server 110 are shown as service providing servers in FIG. 1, it is apparent to those skilled in the art that the service providing servers are not limited to them and may include a server for providing a variety of services such as shopping, and viewing books and movies.

Although the search server 108 and the game server 110 are included in a single system in FIG. 1, the search server 108 and the game server 110 may be included in separate systems. It is apparent to those skilled in the art that the service providing servers included in the service providing system shown in FIG. 1 may be provided by the same content provider or may be provided by different content providers according to an additional theme.

Figure 2:
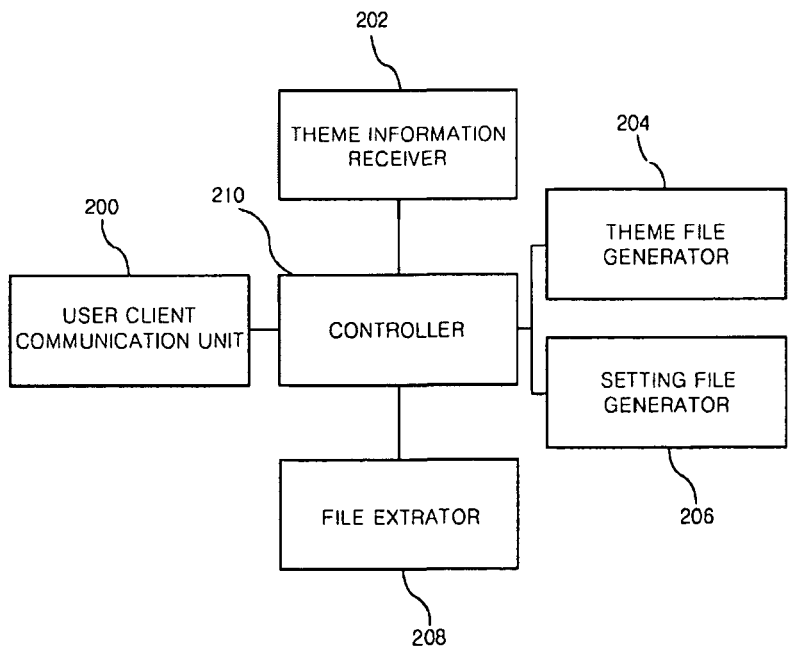
FIG. 2 is a block diagram showing the detailed configuration of a file server according to the embodiment of the present invention.

FIG. 2 is a block diagram showing the detailed configuration of the file server 112 according to the embodiment of the present invention.

As shown in FIG. 2, the file server 112 according to the present invention may include a user client communication unit 200, a theme information receiver 202, a theme file generator 204, a setting file generator 206, a file extractor 208 and a controller 210.

When the user makes a request for the download of the toolbar application 104 via the web server 106, the user client communication unit 200 establishes the connection with the user client 100 and provides the toolbar application 104 according to the user's request for the download of the toolbar application 104.

If the theme file and the setting file are separately stored according to at least one theme, the user client communication unit 200 receives theme selection information of the user and provides the toolbar application 104 corresponding to the selected theme.

In the present invention, information on the theme may be added by the request of the content provider. For example, when a provider for providing a Nexon game wants to add its site information to the toolbar according to the present invention, the Nexon theme may be added.

The theme information receiver 202 receives information about a theme to be added. As described above, the theme information may include at least one of the representative name, the representative URL, the representative service name, the representative service URL and the layer information of a site to be added. Here, the layer information may include the name and the URL of the low-level service provided by the site.

The theme file generator 204 generates a theme file using the theme information. According to the present invention, the theme file may be generated on the basis of an extensible markup language (XML) and may have a field structure shown in FIG. 5.

Figure 5:
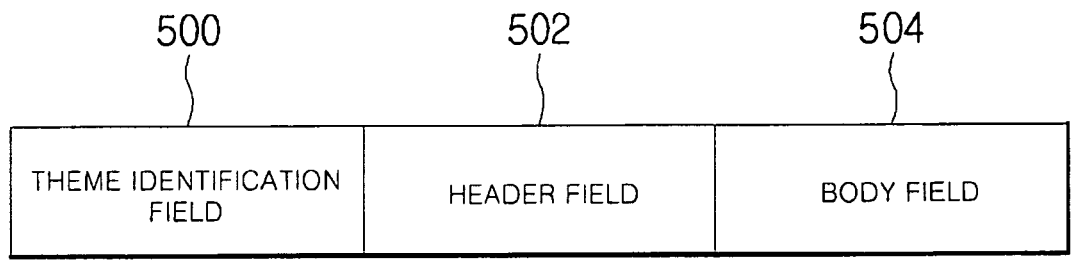
FIG. 5 is a view showing the field structure of a theme file and a setting file according to the present invention.

Referring to FIG. 5, the theme file may include a theme identification field 500, a header field 502 and a body field 504.

Information for identifying the theme is stored in the theme identification field 500. By the information stored in the theme identification field 500, it can be identified that the file is a file for a specific theme.

The header field 502 is a field for storing registration information of the theme file. For example, a theme name, a version, a creator, a creating time and a last modifying time may be stored in the header filed 502.

Figure 6:
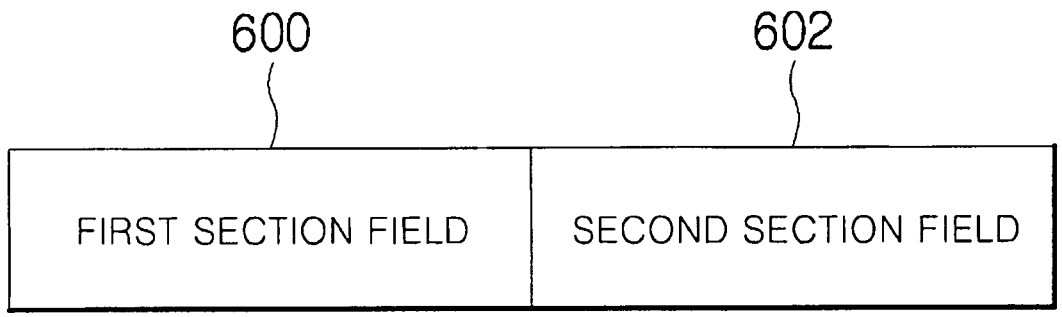
FIG. 6 is a view showing the structure of a body field of the theme file and the setting file according to the present invention.

The body field 504 is a field including information about the items which can be displayed on the screen and is divided a first section field 600 and a second section field 602 according to a region displayed in the toolbar as shown in FIG. 6.

Referring to FIG. 6, the first section field 600 is a field for defining a front region of the inputting bar 1600 and the second section field 602 is a field for defining a rear region of a move button 1602, in the toolbar region shown in FIGS. 16 to 19. According to the present invention, a list of items which can be displayed on the screen is stored in the section fields 600 and 602.

Figure 7:
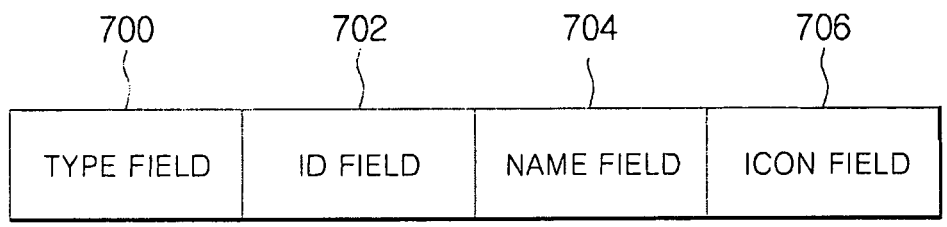
FIG. 7 is a view showing the structure of section fields included in the body field of FIG. 6.

Meanwhile, the item information included in the body field 504 indicates information for defining the attribute of the interface displayed on the toolbar and may include a type field 700, an ID field 702, a name field 704 and an icon field 706 as shown in FIG. 7.

The type field 700 indicates a field for recording information about the type of the interface. Information indicating a method for displaying a specific interface on the screen is recorded in the type field 700. For example, any one of a drop-down button, a pull-down button, a basic button, a basic menu, a menu panel and a separator may be stored in the type field 700.

Figure 8:
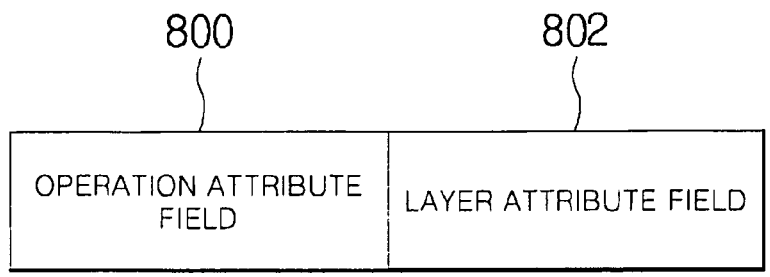
FIG. 8 is a view showing the detailed structure of an item definition field according to the present invention.

The interface displayed on the toolbar may have at least one of an operation attribute and a layer attribute according to the type, as shown in FIG. 8.

For example, an interface belonging to the drop-down button may include both the operation attribute and the layer attribute, an interface belonging to the pull-down button and the menu panel may include only the layer attribute, and an interface belonging to the basic button and the basic menu may have only the operation attribute.

Figure 9:
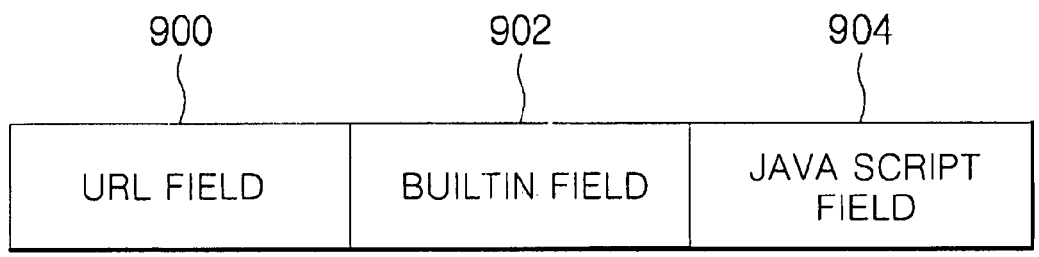
FIG. 9 is a view showing the type of an operation attribute field according to the present invention.

The operation attribute field 800 of the theme file may include one of a URL field for defining the connection to a predetermined URL, a built in field for executing one of functions included in the toolbar application 104, and a java script field for defining the execution of the java script, as shown in FIG. 9.

Information about items belonging to the low-level layer of the item displayed on the screen is recorded in the layer attribute field 802.

The theme file generator 204 generates a theme file having a XML format shown in FIG. 10 on the basis of the above-described field structure.

When the toolbar application 104 is first installed, the setting file generator 206 generates a setting file for storing default (basic value) information of an item which is set to be displayed in the toolbar.

If a theme is added, the setting file generator 206 may include an item (e.g., a Hangame item, a Nexon item or the like) related to the added theme in a setting file. Such a setting file includes the fields shown in FIGS. 5 to 7, similar to the theme file, and may be generated in the format shown in FIG. 11.

When specific theme selection information is transmitted to the file server 112, the file extractor 208 receives the theme selection information of the user and extracts a theme file and a setting file corresponding to the selected theme, under the control of the controller 210.

The user client communication unit 200 transmits the extracted theme file and setting file to the user client 100 together with the execution file for executing the toolbar application 104.

Figure 3:
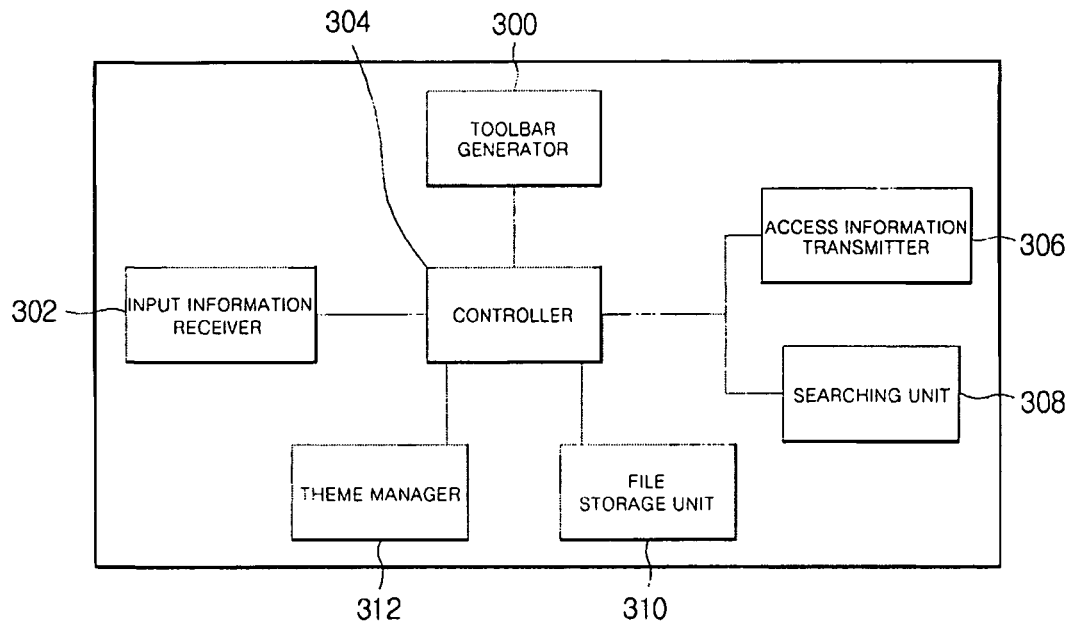
FIG. 3 is a block diagram showing the detailed configuration of a toolbar application according to the embodiment of the present invention.

FIG. 3 is a block diagram showing the detailed configuration of the toolbar application according to the embodiment of the present invention.

As shown in FIG. 3, the toolbar application 104 according to the present invention may include a toolbar generator 300, an input information receiver 302, a controller 304, an access information transmitter 306, a searching unit 308, a file storage unit 310 and a theme manager 312.

When the toolbar application 104 is installed in the user client 100, the toolbar generator 300 changes a registry setting value of the browser such that the toolbar is generated in the predetermined region of the browser.

The toolbar generator 300 outputs an interface according to the theme selected by the user on the toolbar, as shown in FIGS. 16 to 19.

The input information receiver 302 receives information inputted in the inputting bar of the toolbar by the user. Here, the input information may include address information and keyword information of a specific site.

The controller 304 transmits the input information received by the input information receiver 302 to the access information transmitter 306, and the access information transmitter 306 transmits the input address information to the browser 102 or generates query information corresponding to the keyword inputted by the user to transmit to the browser 102.

When the user inputs a keyword for searching the desktop, the searching unit 308 searches for a file corresponding to the keyword and outputs the search result.

The file storage unit 310 stores the theme file and the setting file received from the file server 112.

The theme manager 312 processes a user's request for editing the item, and updates the setting file stored in the file storage unit 310 according to the edited result. The theme manager 312 will now be described in detail with reference to FIG. 4.

Figure 4:
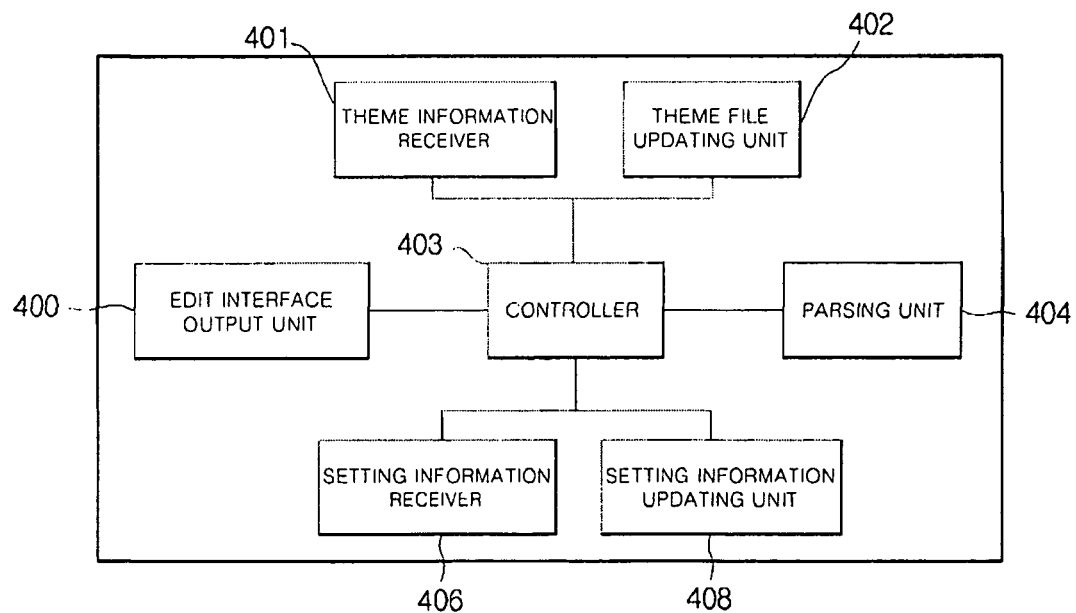
FIG. 4 is a block diagram showing the detailed configuration of a theme manager according to the embodiment of the present invention.

FIG. 4 is a block diagram showing the detailed configuration of the theme manager according to the embodiment of the present invention.

As shown in FIG. 4, the theme manager 312 according to the present invention may include an edit interface output unit 400, a theme information receiver 401, a theme file updating unit 402, a controller 403, a parsing unit 404, a setting information receiver 406 and a setting information updating unit 408.

When the user makes a request for editing, the edit interface output unit 400 outputs an edit interface shown in FIG. 12.

When the user makes the request for editing, the parsing unit 404 parses information on all the items (items included in the theme file) which can be displayed in the toolbar and information about an item which is currently displayed in the toolbar. The edit interface output unit 400 outputs the information about the items which can be displayed in the toolbar through this parsing process.

At this time, the edit interface output unit 400 may output an icon corresponding to an item included in the second section field of the theme file or an icon corresponding to an item included in the second section field of the setting file.

As shown in FIG. 12, the edit interface according to the present invention includes an item adding region. The user can select "add item" so as to add a site, a java script and a local program.

For example, if the user wants to add a new site, the edit interface output unit 400 additionally outputs an interface including a region for inputting the type, the name and the URL of an interface which can access the site. At this time, the interface for adding the site may include a region which can additionally input access information of a service belonging to a low-level layer of the site to be added.

If the user adds an item, the theme information receiver 401 receives item addition information inputted by the user, and the theme file updating unit 402 adds the received item information to the theme file so as to update the theme file.

Alternatively, the user may remove an item included in the setting file or selectively add an item which is not included in the setting file, through the edit interface.

For example, as shown in FIG. 18, if the items (detailed information about these items is stored in the theme file) such as "Hangame", "My PC search", "Dictionary", "My blog", "Popup blocking", "Shortcut", "Anti-virus" and "ZOOM" can be provided with respect to the Hangame theme, the user includes "Hangame", "My PC search", "Dictionary", "My blog", "Popup blocking" and "shortcut" in the setting file and establishes the order of the items.

The setting information receiver 406 receives the setting information of the user and the setting information updating unit 408 updates the setting file information according to the information edited by the user.

The toolbar interface may be dynamically configured according to the information edited by the user through the above-described process.

Figure 13:
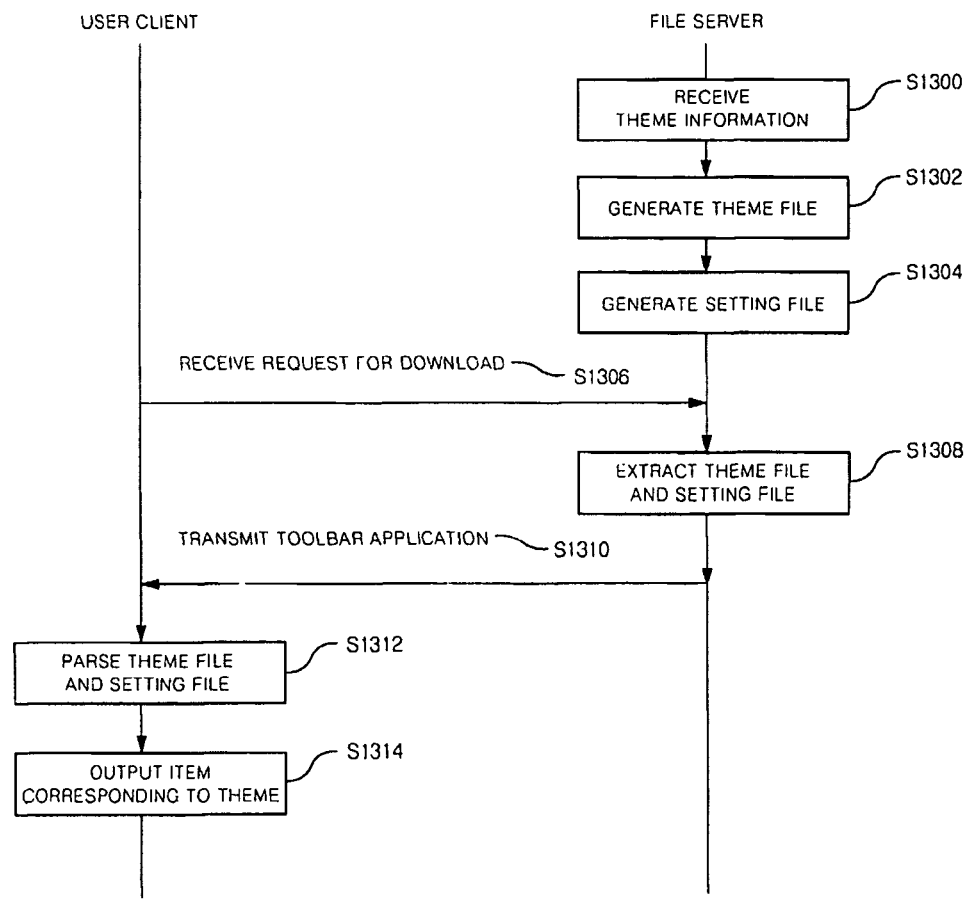
FIG. 13 is a flowchart illustrating a method for providing a toolbar service according to the present invention.

FIG. 13 is a flowchart illustrating a method for providing the toolbar application according to the present invention. FIG. 13 shows a case where the file server 112 generates a theme file and setting file which vary according to a theme.

Referring to FIG. 13, the file server 112 receives theme information from a specific content provider (step 1300) and generates a theme file including the received theme information (step 1302).

At this time, the file server 112 also generates a setting file including an item corresponding to the theme as a basic value (step 1304).

When the user makes a request for the download of the toolbar application 104, the user client 100 transmits information about the request for the download including the theme information selected by the user to the file server 112 (step 1306).

The file server 112 identifies the theme selected by the user and extracts the theme file and setting file corresponding to the theme (step 1308).

The file server 112 transmits the extracted theme file and setting file and an execution file for executing the toolbar application 104 to the user client 100 (step 1310).

The user client 100 parses the theme file and setting file at the time of installing the toolbar application 104 (step 1312) and outputs an interface corresponding to an item included in the setting file on the toolbar (step 1314).

The user can use the user interface according to a desired theme and easily access a desired site or information through the above-described process.

Figure 14:
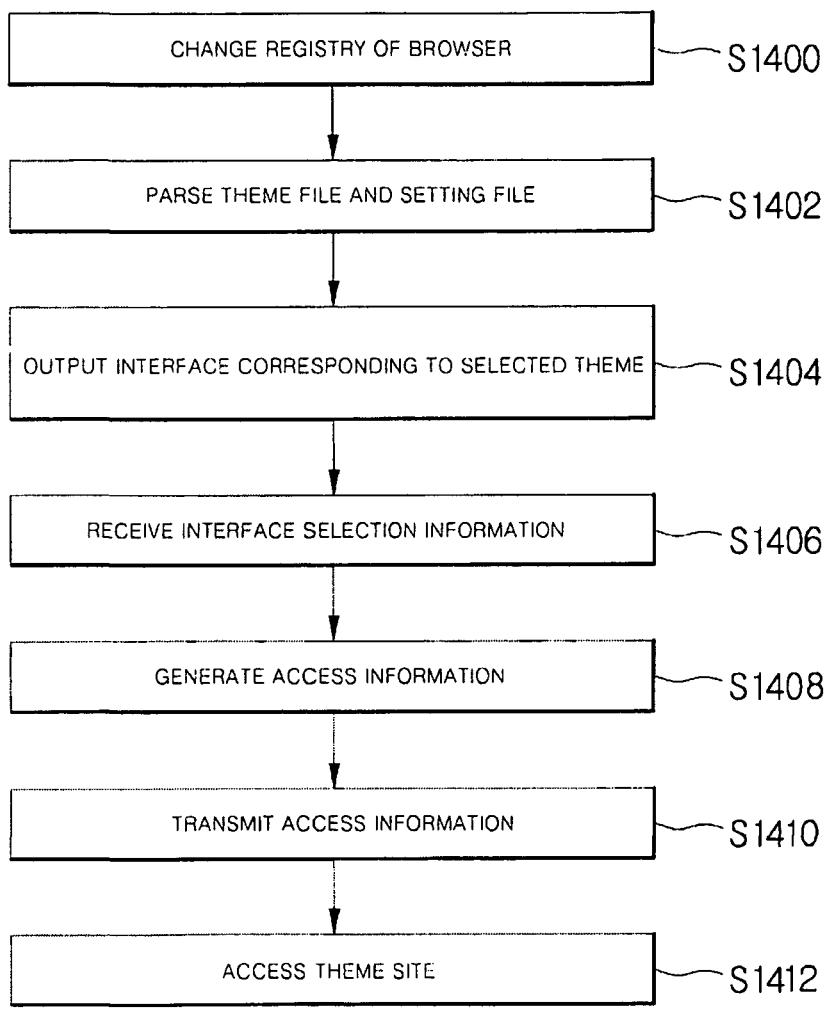
FIG. 14 is a flowchart illustrating a method for selecting the theme of the toolbar according to the present invention.

FIG. 14 is a flowchart illustrating a method for installing the toolbar application according to the present invention. FIG. 14 shows a case where the toolbar application 104 corresponding to one of a plurality of themes is installed as shown in FIG. 13.

Referring to FIG. 14, the toolbar application 104 changes a registry setting value of the browser (step 1400) and parses information included in the theme file and the setting file (step 1402).

An interface corresponding to a theme item is output on the toolbar through the above-described steps (step 1404).

Thereafter, the toolbar application 104 receives interface selection information corresponding to the theme item (step 1406) and generates access information corresponding to the received information (step 1408).

The toolbar application 104 transmits the address information of the site to the browser 102 according to the selection of the interface (step 1410).

Accordingly, the user client 100 can directly access the site corresponding to the theme selected by the user (step 1412).

Figure 15:
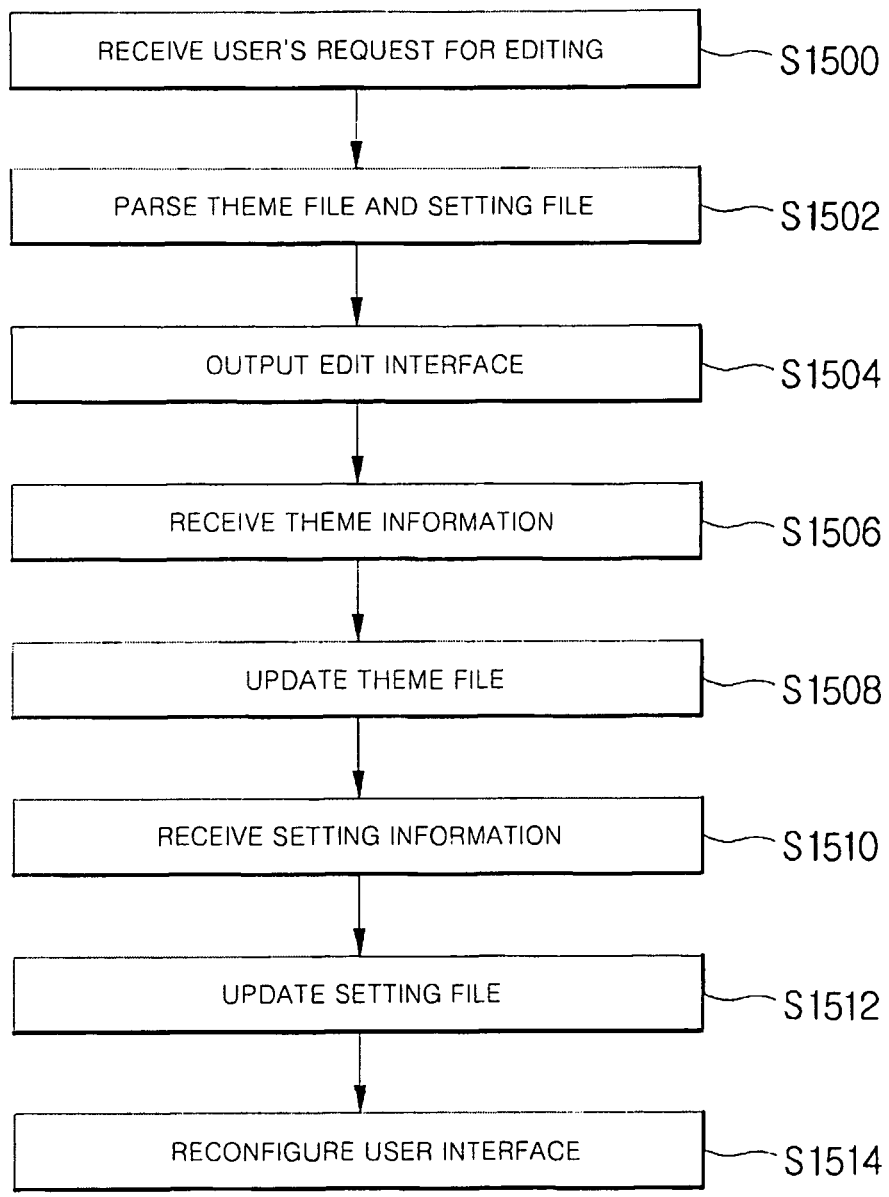
FIG. 15 is a flowchart illustrating a method for editing a toolbar according to the present invention.

FIG. 15 is a flowchart illustrating a method for editing the toolbar according to the present invention, which is performed by the theme manager as described above.

Referring to FIG. 15, the theme manger receives the user's request for editing the toolbar (step 1500), parses the theme file and setting file which are previously stored (step 1502), and outputs the edit interface (step 1504).

According to the present invention, among the items included in the theme file, the item information included in the second section field is output on the edit interface. At this time, icons corresponding to items are displayed in different regions, depending on whether the item is displayed in the current toolbar.

If the user adds a new item, the theme manager receives the item addition information of the user (step 1506) and updates the theme file according to the added item information (step 1508).

If the user changes the item to be displayed in the toolbar through the edit interface, the theme manager receives the setting information of the user (step 1510) and updates the setting file according to the setting information (step 1512).

The user interface is reconfigured according to the updated theme file and setting file (step 1514).

Although the embodiments of the present invention have been disclosed for illustrative purposes, those skilled in the art will appreciate that various modifications, additions and substitutions are possible, without departing from the scope and spirit of the invention as disclosed in the accompanying claims.

As described above, according to the present invention, it is possible to provide a toolbar application including information on a predetermined theme such that a user can easily access a desired site.

According to the present invention, it is possible to display a low-level layer belonging to each theme in the toolbar such that the user can rapidly access a desired site.

According to the present invention, it is possible to allow the user to edit the toolbar such that the user can dynamically generate a desired interface.

The invention claimed is:

1. A method for providing a toolbar service in a system connected to a user client via a network, the method comprising:

generating, by a service providing server, a file which can be edited by a user and is used to define an interface displayed in a toolbar, the file including a theme file and a setting file,
  the theme file including theme information, the theme information defining,
    a motif of the toolbar, the motif of the toolbar being associated with at least one attribute of the service providing server, and
    at least one attribute for at least one toolbar item, the toolbar item being associated with at least one service that is provided by the service providing server,
  the setting file defining a function for the at least one item to be included in the toolbar based on the theme information, the function being used to provide the at least one service;
receiving, by the service providing server, a request for download of a toolbar application from the user client through the service providing server; and
transmitting, by the service providing server, the toolbar application including the file to the user client,
the toolbar application configured to update the theme file and the setting file according to a request for editing the toolbar, the request for editing the toolbar includes a request to add at least one of (i) another service to be provided by the service providing server and (ii) a service to be provided by another service providing server,
the toolbar application configured to parse the updated theme file and the updated setting file to dynamically generate the interface of the toolbar, and
the toolbar application configured to cause the user client to display the generated interface of the toolbar including the updated theme file and the updated setting file.

2. The method according to claim 1, wherein the file includes at least one of a type field for identifying a type of the interface, an ID field, a name field and an icon field, and wherein the toolbar application updates the file using information inputted by the user according to the fields.

3. The method according to claim 2, wherein the type field has at least one of an operation attribute and a layer attribute, and wherein the operation attribute includes at least one of movement to a specific uniform resource locator (URL), execution of a function which is previously stored and execution of a java script, and wherein the layer attribute includes node list information of a low-level service of a site corresponding to the service providing server.

4. The method according to claim 1, wherein, the generating of the file includes:
  generating the theme file including item information of all interfaces which can be output on the toolbar, according to at least one theme defined the theme file, the theme file including item information which can access a site corresponding to the at least one theme; and
  generating the setting file including item information of an interface which is set to be output on the toolbar, among interfaces.

5. The method according to claim 4, wherein the generating of the setting file includes storing the item information for accessing a site corresponding to a theme as a basic value.

6. The method according to claim 4, wherein the theme file and the setting file are generated on the basis of an extensible markup language (XML).

7. The method according to claim 4, wherein each of the theme file and the setting file includes at least one of a theme identification field which stores information for identifying a theme, a header field for storing registration information, and a body field for storing the item information.

8. The method according to claim 7, wherein the body field includes a first section field for storing item information which is maintained regardless of a theme and a second section field for storing item information which is added according to at least one of the theme and a user's request.

9. The method according to claim 4, wherein the item information includes at least one of a representative name, a representative URL, a representative service name, a representative service URL and layer information of the site.

10. The method according to claim 9, wherein the layer information includes a name and a URL of a low-level service provided by the site.

11. The method according to claim 1, further comprising activating a toolbar editing dialog box to allow a user of the user client to control the updating.

12. A computer program product in a non-transitory computer readable storage medium for providing a toolbar service, the product comprising:
  a program code for generating, by a service providing server, a file which can be edited by a user and is used to define an interface displayed in a toolbar, the file including a theme file and a setting file,
    the theme file including theme information, the theme information defining,
      a motif of the toolbar, the motif of the toolbar being associated at least one attribute of a service providing server, and
      at least one attribute for at least one toolbar item, the toolbar item being associated with at least one service that is provided by the service providing server,
    the setting file defining a function for the at least one item to be included in the toolbar based on the theme information, the function being used to provide the at least one service;
  a program code for receiving a request for download of a toolbar application from the user;
  a program code for transmitting the toolbar application including the file to the user, and
  the toolbar application configured to update the theme file and the setting file according to a request for editing the toolbar, the request for editing the toolbar includes a request to add at least one of (i) another service to be provided by the service providing server and (ii) a service to be provided by another service providing server,
  the toolbar application configured to parse the updated theme file and the updated setting file to dynamically generate the interface of the toolbar, and
  the toolbar application configured to cause the user client to display the generated interface of the toolbar including the updated theme file and the updated setting file.

13. A computer program product in a non-transitory computer readable storage medium for displaying a toolbar, the product comprising:
  a program code for maintaining, by a user client, a file which can be edited by a user and is used to define an interface displayed in a toolbar, the file including a theme file and a setting file,
    the theme file including theme information, the theme information defining,
      a motif of the toolbar, the motif of the toolbar being associated at least one attribute of a service providing server, and at least one attribute for at least one toolbar item, the toolbar item being associated with at least one service that is provided by the service providing server, the setting file defining a function for the at least one item to be included in the toolbar based on the theme information, the function being used to provide the at least one service;

a program code for parsing the file to output item information included in the setting file when a request for editing the toolbar is received, the request for editing the toolbar including a request to add at least one of (i) another service to be provided by the service providing server and (ii) a service to be provided by another service providing server;

a program code for updating the theme file and the setting file according to the request for editing the toolbar;

a program code for parsing the updated theme file and the updated setting file to dynamically generate the interface of the tool bar; and a program code for displaying the generated interface of the toolbar including the updated theme file and the updated setting file.

14. An apparatus to provide a toolbar service in a system connected to a user client via a network, the apparatus comprising:

a processor configured to execute a file generator, a file extractor, and a user client communication unit, wherein the file generator is configured to generate a file which can be edited by a user and is used to define an interface displayed in a toolbar, the file includes a theme file and a setting file, the theme file includes theme information, the theme information defining, a motif of the toolbar, the motif of the toolbar being associated at least one attribute of a service providing server, and at least one attribute for at least one toolbar item, the toolbar item being associated with at least one service that is provided by the service providing server, the setting file defining a function for the at least one item to be included in the toolbar based on the theme information, the function being used to provide the at least one service, the file extractor is configured to extract the file when a request for download of a toolbar application is received from the user client, the user client communication unit is configured to transmit the toolbar application including the file to the user client;

the toolbar application installed in the user client is configured to, update the theme file and the setting file according to a request for editing the toolbar by allowing the user to activate a dialog from the toolbar, the request for editing the toolbar includes a request to add at least one of (i) another service to be provided by the service providing server and (ii) a service to be provided by another service providing server, and parse the updated theme file and the updated setting file based on the request for editing the toolbar to dynamically generate the interface of the toolbar; and cause the user client to display the generated interface of the toolbar including the updated theme file and the updated setting file.

15. The apparatus according to claim 14, wherein the file includes at least one of a type field for identifying a type of the interface, an ID field, a name field and an icon field, and wherein the toolbar application updates the file using information input by the user according to the fields.

16. The apparatus according to claim 15, wherein the type field has at least one of an operation attribute and a layer attribute, and wherein the operation attribute includes at least one of movement to a specific uniform resource locator (URL), execution of a function which is previously stored, and execution of a java script, and wherein the layer attribute includes node list information of a low-level service of a site corresponding to the service providing server.

17. The apparatus according to claim 14, wherein, the file generator includes:

a theme file generator for generating the theme file including item information of all interfaces which can be output on the toolbar, according to at least one theme defined the theme file, the theme file including item information which can access a site corresponding to the at least one theme; and a setting file generator for generating the setting file including item information of an interface which is set to be output on the toolbar, among interfaces.

18. The apparatus according to claim 17, wherein the theme file and the setting file are generated on the basis of an extensible markup language (XML).

19. The apparatus according to claim 17, wherein each of the theme file and the setting file includes at least one of a theme identification field which stores information for identifying a theme, a header field for storing registration information, and a body field for storing the item information.

20. The apparatus according to claim 19, wherein the body field includes a first section field for storing item information which is maintained regardless of a theme and a second section field for storing item information which is added according to at least one of the theme and a user's request.

* * * * *